H. B. CARY.
FRUIT SIZER.
APPLICATION FILED AUG. 27, 1906.
931,993.
Patented Aug. 24, 1909.
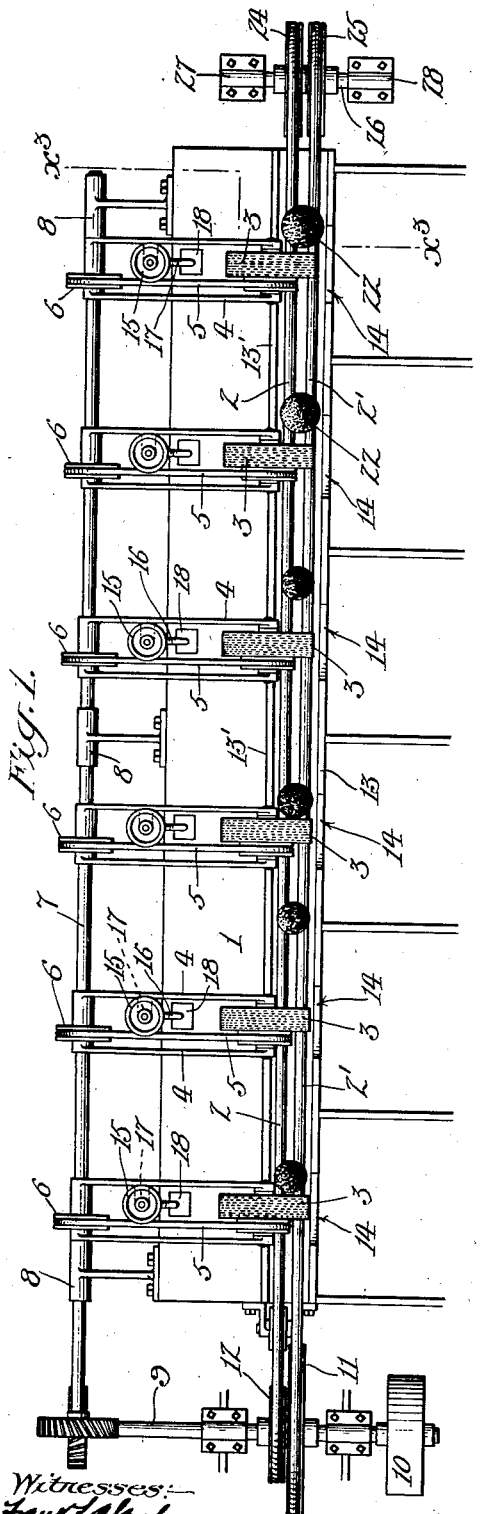
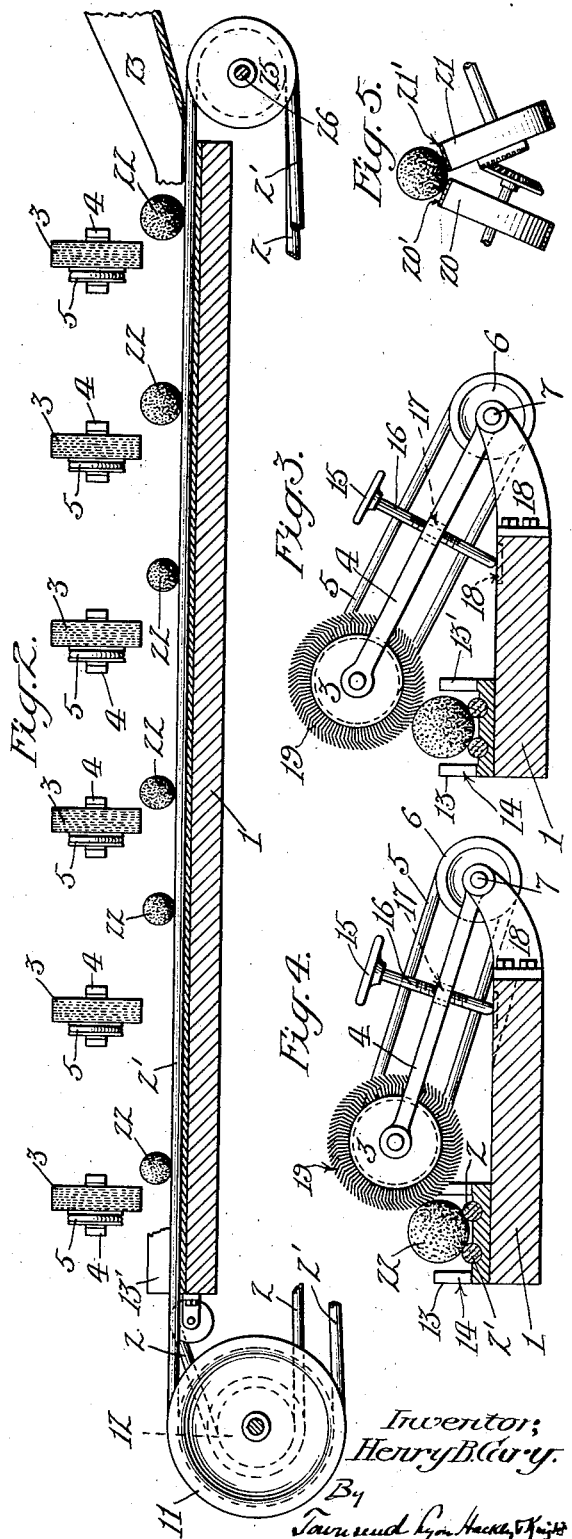
Witnesses:
Inventor:
Henry B. Cary.
By
His Attys

UNITED STATES PATENT OFFICE.

HENRY B. CARY, OF LOS ANGELES, CALIFORNIA.

FRUIT-SIZER.

931,993.

Specification of Letters Patent. Patented Aug. 24, 1909.

Application filed August 27, 1906. Serial No. 332,299.

*To all whom it may concern:*

Be it known that I, HENRY BOUNDS CARY, a citizen of the United States, residing at Los Angeles, county of Los Angeles, and State of California, have invented a new and useful Fruit-Sizer, of which the following is a specification.

The object of my invention is to provide a fruit sizer which will accurately select fruits all of one size and separate them from fruits of all other sizes and deposit them in a separate receptacle without bruising or injuring the same.

Another object of my invention is to provide a machine of the character above described which will require little power to operate it and will at the same time size great quantities of fruit.

Another object is to provide a fruit sizer which will continuously and rapidly rotate the fruit during its travel along the gradeway whereby every diameter of the fruit is presented to the sizing or separating mechanism so that each fruit will be segregated from the other fruits according to its largest diameter and deposited into its proper receptacle.

The invention will be more readily understood by reference to the accompanying drawings which illustrate my invention and in which:—

Figure 1 is a plan view of my fruit sizer. Fig. 2 is a diagrammatic view showing the arrangement of the separating means at graduated heights above the conveying means. Fig. 3 is a detail view of the separating means or sizing brush and the adjusting means therefor, taken on line $x^3$—$x^3$ Fig. 1. Fig. 4 is a detail view of the sizing brush and adjusting means, being arranged to bring the sizing brush into contact with the fruit in such manner as to insure the lifting of the fruit from the conveying means. Fig. 5 is a detail view showing means for using flat belts.

1 is the bed of the sizer upon which are carried the traveling belts 2 and 2'.

3 is a rotating circular separating or sizing member carried in a swinging support 4.

5 is a belt for rotating the sizing member 4.

6 is a pulley mounted upon a shaft 7 which is mounted in suitable bearings such as 8 and is driven by means of the main power shaft 9, power being derived from suitable power means, (not shown,) through the pulley 10.

Motion is given to the traveling belts 2, 2' by means of the pulleys 11 and 12 mounted on the power shaft 9 to drive the belts longitudinally of the bed of the sizer. The pulley 11 is herein shown as being of more than twice the circumference of the pulley 12 thereby giving to the belt 2' more than twice the speed of the belt 2.

The belts 2, 2' travel in a grooved plate on the bed of the machine which may be provided with guard rails 13, 13' on the sides of the grooved plate. Outlets or notches 14 corresponding to the points at which the sizing brushes 3 are hung, are provided in one of the guard rails opposite the point of support of the brush.

15 is a hand wheel and 16 a screw. The screw 16 passes through a screw threaded opening in the swinging support 4, at 17 and its end rests upon the bed of the machine, a metal plate 18 being preferably provided for the end to rest upon.

In Figs. 3 and 4 I have shown the rotating surface of sizing or separating member made of wire with the ends of the wires curved or bent backwardly from the line of rotation as at 19. Other material may be used on the surface of the rotating members which will afford the proper or necessary frictional contact with the fruit.

In Fig. 5, 20 and 21 represent flat pulleys actuated by gears meshing together to drive flat belts 20', 21'. These flat belts may be substituted for the round belts or ropes 2, 2' if desired.

22, 22 represent fruits passing along the grade-way.

23 represents chute to direct the fruit onto the grade-way.

24 and 25 are loose pulleys on a shaft 26 supported in bearings 27 and 28.

In operation the fruits are delivered into the grade-way from a hopper (not shown) through the chute 23, and are carried by the belts 2, 2' toward the foot or tail of the machine. The belt 2' being actuated by and running over the pulley of larger circumference, has a greater speed than the belt 2 which is actuated by and runs over the pulley of smaller circumference and therefore the fruits which are carried forward by these belts are rotated as they are carried forward. The rotation of the fruit as it passes along the grade-way causes all of its sides to be presented to the separating means or brushes during its course along the grade-way and insures the separating means, which is adjusted for any particular size, to come into contact with any fruit which may have a diameter corresponding to the grade of that particular separating means, thus insuring the separation by such particular separating means or brush of any fruit having a diameter corresponding to its grade. In other words, the graders, or separators are located at different distances from the conveyer along the length of the same, and each separator is arranged to contact or engage with the fruit at a point at one side of a vertical plane through the longitudinal center of the conveyer. By constructing the machine in this manner each individual fruit is only engaged by the grader which removes it and it is engaged at a point below its top so as to be lifted up over the side of the conveyer and removed therefrom by said grader without the possibility of the fruit being squeezed or bruised thereby in any manner.

In Fig. 1 it will be noted that the ropes or belts 2, 2' converge slightly so that they run nearer together at the tail of the machine than at the head. By this slight divergence from actual parallelism I provide for the oranges resting between the belts while being carried forward toward the tail of the machine. Thus the largest sizes of oranges rest down between the belts 2, 2' so that the arc of the orange resting between the belts is sufficient to prevent the oranges from rolling off the belts. As the belts converge toward the tail of the machine the smaller size oranges are gradually raised on the belts as they approach the separating means provided for lifting them off the belts. Thus when the separation takes place a corresponding arc of the orange, regardless of size, rests on and between the belts.

It will be noted that as the belt or rope 2' travels more rapidly than the belt 2, the oranges are given spiral rotation on the belts and away from the outlets 14. Any unevenness or bumps on the orange tending to throw the orange off the belts will therefore throw the orange against the guard or rail 13' and away from the outlets. Large oranges on the belts 2, 2' may be followed by oranges of smaller size.

The separating means which contacts with the large size orange will not contact with the orange of smaller size following such large orange and the spiral rotation given to the oranges on the belts prevents the small orange being thrown off the belts and out the outlet with such large orange, thus insuring the carrying of the small orange along the grade-way until it finds its proper grade or size.

Having thus described my invention, I claim,

1. A fruit sizer having conveying means consisting of two members traveling horizontally at different speeds, and rotating separating means arranged thereabove at graduated heights, said separating means having their axes parallel with the conveyer and their peripheries arranged to contact with the fruits at the sides of the fruits and push such fruits off transversely from the conveying means.

2. A fruit sizer having a carrier composed of two members traveling horizontally at different speeds, rotating separating means arranged above said carrier at graduated heights, with their peripheries moving diagonally upward where they engage with the fruit and means for adjusting the heights of said separating means.

3. A fruit sizer having a carrier composed of two members traveling horizontally at different speeds, a series of rotating brushes mounted at graduated heights above said carrier, said brushes mounted to lift the fruits from said carrier by contacting with the fruits on said carrier at the sides of the fruits, and means for adjusting the heights of said brushes.

4. A fruit sizer having a carrier composed of two belts mounted to travel horizontally, driving pulleys for said belts, one of said pulleys being of larger diameter than the other to cause one belt to travel more rapidly than the other, and brushes mounted in adjustable frames along the paths of and above said belts in position to engage with fruits carried by said carrier below the tops thereof and lift the fruits therefrom.

5. A fruit sizer having conveying means consisting of two converging members traveling horizontally at different speeds, rotating separating means arranged thereabove at graduated heights, and means, at the outer sides of said conveying means, for insuring the retention of the fruit thereon, provided with outlets, said separating means arranged to engage with the fruits at the sides and below the tops thereof and to lift the fruits from the conveying means when the fruits arrive opposite said outlets.

6. A fruit sizer having a fruit carrier traveling horizontally and rotary separating means arranged at the side of the center of said carrier and at graduated heights above the same the axis of each separator being parallel with the carrier and its periphery arranged to engage with the fruit on the carrier below its top and remove it from the carrier.

7. A fruit sizer having a grade-way composed of two belts or ropes traveling horizontally and converging slightly, guards at the sides of said grade-way, outlets provided in one of said guards, the belt nearest said outlets traveling at greater speed than the other belt, and rotary brushes arranged at graduated heights above said belts at said outlets, said brushes arranged to contact with the fruits on said belts and lift them off therefrom.

In testimony whereof, I have hereunto set my hand at Los Angeles California this 17th day of August 1906.

HENRY B. CARY.

In presence of—
FREDERICK F. LYON,
FRANK L. A. GRAHAM.